(12) United States Patent
Hirschman et al.

(10) Patent No.: US 8,438,627 B1
(45) Date of Patent: May 7, 2013

(54) ACCESS GATEWAY

(75) Inventors: Brent Hirschman, Overland Park, KS (US); Jeremy Breau, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1196 days.

(21) Appl. No.: 11/538,142

(22) Filed: Oct. 3, 2006

(51) Int. Cl.
*G06F 21/00* (2006.01)

(52) U.S. Cl.
USPC ............ 726/12; 726/13; 726/14; 726/15; 709/227; 709/228; 709/229; 709/230; 370/331; 370/338; 370/349

(58) Field of Classification Search .......... 455/410–411, 455/418, 436; 380/27–30; 370/331, 349, 370/338; 709/223, 224, 203, 227–230; 726/12–15
See application file for complete search history.

(56) References Cited

U.S. PATENT DOCUMENTS

| | | | | |
|---|---|---|---|---|
| 6,993,335 | B2* | 1/2006 | Natarajan et al. | 455/437 |
| 7,369,562 | B2* | 5/2008 | Johansson et al. | 370/401 |
| 7,620,015 | B2* | 11/2009 | Lenzarini | 370/331 |
| 8,059,599 | B1* | 11/2011 | Rogers et al. | 370/331 |
| 8,130,722 | B1* | 3/2012 | Breau et al. | 370/331 |
| 2002/0151308 | A1* | 10/2002 | Baba et al. | 455/446 |
| 2003/0031151 | A1* | 2/2003 | Sharma et al. | 370/338 |
| 2004/0235455 | A1* | 11/2004 | Jiang | 455/411 |
| 2006/0116127 | A1* | 6/2006 | Wilhoite et al. | 455/442 |

FOREIGN PATENT DOCUMENTS

WO   WO 2005117463   * 12/2005

OTHER PUBLICATIONS

Robert Hsieh et. al, S-MIP: A seamless Handoff architecture for mobile IP, 2003, IEEE.*

* cited by examiner

*Primary Examiner* — Taghi Arani
*Assistant Examiner* — Josnel Jeudy

(57) ABSTRACT

A system, a method and computer-readable media for establishing connectivity over a plurality of access technologies. A system is provided that includes a client device. The client device is configured to communicate over a network by utilizing at least two access technologies. The system also includes a gateway in communication with the client device. The gateway includes multiple access technology termination nodes configured to support communications utilizing multiple access technologies. The gateway also includes a registration manager configured to assign the client device an address for identifying the client device. The registration manager is further configured to maintain the address assigned to the client device when the client device switches from utilizing a first access technology to utilizing a second access technology.

20 Claims, 4 Drawing Sheets

ACCESS GATEWAY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Recent developments in wireless telecommunications have ushered in a new era of mobility. The advent of cellular and personal communications services has enabled people to maintain communication from virtually any location. Further, advanced technology has facilitated not only wireless voice communication but also wireless data communication, such as the ability to communicate over computer networks and to send and receive data and other content.

Wireless communications systems have existed for many years. In general, a wireless communications system uses mobile or fixed radios that communicate with a fixed radio tower that is in turn interconnected to a larger telecommunications network. Such systems can take a variety of forms. For example, traditional cellular communications systems provide radio coverage to a wide area, such as a city, through use of many radio towers. Typically, subscribers to wireless service are equipped with one or more wireless terminals or "client devices," which may take any of a variety of forms. By way of example, a wireless client device may be a telephone, a pager, a computer, a personal digital assistant ("PDA") or any combination of these or other devices. A wireless client device may be configured to receive and/or convey information such as voice and data (e.g., fax, e-mail and other text messages) and/or other media (e.g., audio, video and graphics). Further, the client device may include input and output facilities such as a touch-pad, a keyboard, a camera, a display, a microphone and/or a speaker. Some client devices are equipped with web browsing software to allow subscribers to communicate with web servers over an Internet Protocol (IP) network (i.e., the Internet).

Wireless networks and mobile wireless devices may use a number of channels to transmit and receive information, and a properly equipped wireless device can initiate communications by sending an initiation request message over one of these channels. Applying industry standards, the initiation request message may include a code that characterizes the requested communication as packet-data communication, as compared with traditional voice communication.

With the rapid growth in the area of wireless communications, a variety of different access technologies has emerged. For example, Code Division Multiple Access (CDMA) is a packet-based wireless-access technology that may be used in certain cellular phone systems. As another example, Wi-Fi is an access technology based on a series of specifications from the Institute of Electrical and Electronics Engineers (IEEE) called 802.11. Wi-Fi uses radio frequency and enables a wireless-enabled computer or PDA to connect to the Internet via a wireless access point. Yet another access technology being utilized today is commonly referred to as WiMax (Worldwide Interoperability for Microwave Access). WiMax, also known as the IEEE 802.16 group of standards, defines a packet-based wireless technology that provides high-throughput broadband connections over long distances.

With different access technologies in use today, a variety of problems currently exist in the art. For example, there exist problems associated with allowing devices utilizing different technologies to communicate with one another and allowing a mobile device to move between access technologies. Indeed, separate systems are currently required to support IP connectivity for each individual access technology. This is because the standards bodies that created the standards for the different technologies individually created different requirements for IP connectivity over the various technologies. The result of this approach is an IP handoff for devices moving between technologies. However, as service providers strive to deploy real time services across wireless infrastructures, it is becoming increasing important to minimize such IP handoffs. This is because the handoffs require additional signaling and registration elements, and they introduce extra routing hops and latency. Accordingly, there is a need for improved mechanisms for efficiently establishing and maintaining connectivity with client devices over a plurality of access technologies.

SUMMARY

The present invention provides systems and methods for establishing connectivity over a plurality of access technologies. In one aspect of an embodiment of the present invention, a system is provided that includes a client device. The client device is configured to communicate by utilizing multiple access technologies. The system also includes a gateway in communication with the client device. The gateway includes a plurality of access technology termination nodes configured to support communications utilizing the multiple access technologies. The gateway also includes a registration manager configured to assign the client device an address for identifying the client device. The registration manager is further configured to maintain the address assigned to the client device when the client device switches from utilizing a first access technology to communications utilizing a second access technology.

In another aspect of an embodiment of the present invention, a computer-implemented method is provided for interacting with a mobile device capable of communicating over multiple access technologies. A request is received from the mobile device requesting to initiate a communication session over a first access technology. In response to this request, the device is provided a negotiated address for utilization during the communication session. Another request is received from the mobile device requesting to initiate a second communication session over a second access technology. In response to this request, the negotiated address is reassigned to the mobile device for use during the second communication session.

In yet another aspect of an embodiment of the present invention, a gateway is provided for establishing connectivity with client devices over a plurality of access technologies. The gateway includes a first access technology termination node configured to utilize a first access technology to communication with the client devices. The gateway also includes a second access technology termination node configured to utilize a second access technology to communication with the client devices. An internal subnetwork is also included in the gateway, along with an address assignment component. The address assignment component is configured to assign addresses on the internal subnetwork for identifying client devices in communication with the first access technology termination node and to assign addresses on the internal subnetwork for identifying client devices in communication with the second access technology termination node.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWING

The present invention is described in detail below with reference to the attached drawing figures, wherein.

DETAILED DESCRIPTION

Figure 1:
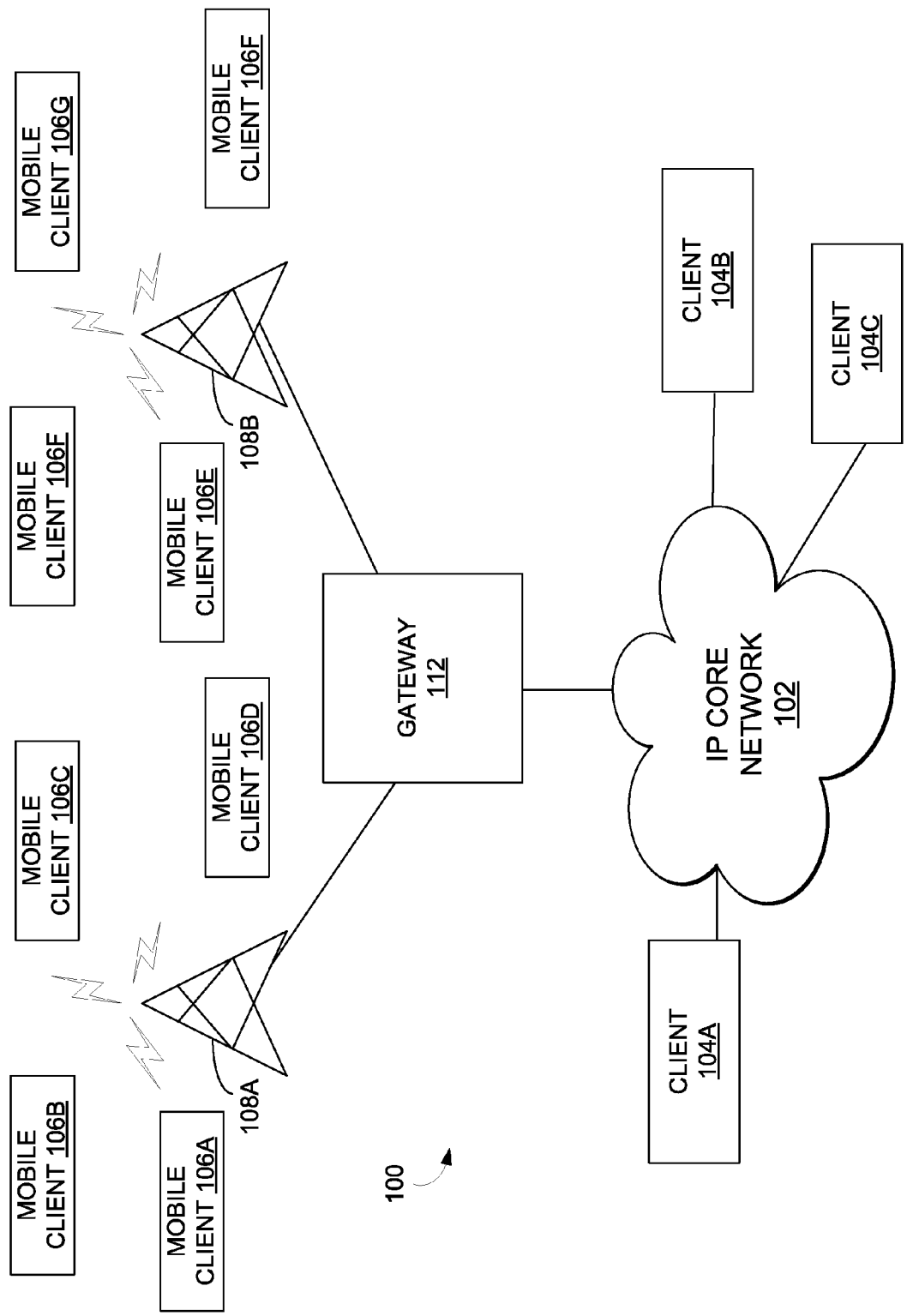
FIG. 1 is a block diagram of a network environment suitable for use in implementing the present invention.

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The present invention provides an improved system and method for maintaining connectivity with client devices over a plurality of access technologies. The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data. Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

The present invention may be embodied as, among other things: a method, system, computer-program product, or combinations thereof. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

The present invention may be practiced in any network environment such as a communications network. Such networks are widely used to connect various types of network elements, such as routers, servers, gateways, network telephones, and so forth. Further, the invention may be practiced in a multi-network environment having various, connected public and/or private networks. The networks may be wireless or wireline ("wired"). As will be appreciated by those skilled in the art, communication networks may take several of different forms and may use several different communication protocols.

FIG. 1 illustrates a network environment 100 that represents an exemplary environment in which the present invention may be practiced. It is important to note that network environments in which the present invention may operate may be arranged in a variety of configurations, and the network environment 100 of FIG. 1 provides only one exemplary network environment.

The network environment 100 includes an IP core network 102. The network 102 may be any network or combination of networks configured to provide communications between network devices. The network 102 provides communication services for clients 104A-104C. The clients 104A-104C may be any computing devices connected to the network 102, and each of the clients 104A-104C may have an address, such as an Internet protocol (IP) address, for uniquely identifying that client. The clients 104A-104C may interact with the network 102 to receive a variety of content such as voice, data or video.

The network environment 100 may also include a wireless communication system configured to provide communication services to mobile clients 106A-106F. In an exemplary wireless communication system, each mobile client 106A-106F may communicate via an air interface with a base transceiver station 108A or a base transceiver station 108B. The base transceiver stations 108A and 108B may be coupled to any number of different devices that enable connectivity with the network 102, the public Internet and/or a private intranet (e.g., a wireless carrier's core network). The base transceiver stations 108A and 108B may utilize any number of wireless access technologies or standards known in the art to communicate with the mobile clients 106A-106F.

In order to facilitate communication sessions originating from the mobile clients 106A-106F, the network environment 100 includes a gateway 112. As known to those skilled in the art, the gateway 112 may provide a variety of functions allowing clients to communicate with the IP core network 102. Such functions may vary based on the type of access technology being utilized by an originating client device. The gateway 112 may receive communication requests from the mobile clients 106A-106F, authenticate the clients and assign IP addresses. Further, as will be explained herein, the gateway 112 may also be used to establish and maintain connectivity with client devices over a plurality of access technologies.

Figure 2:
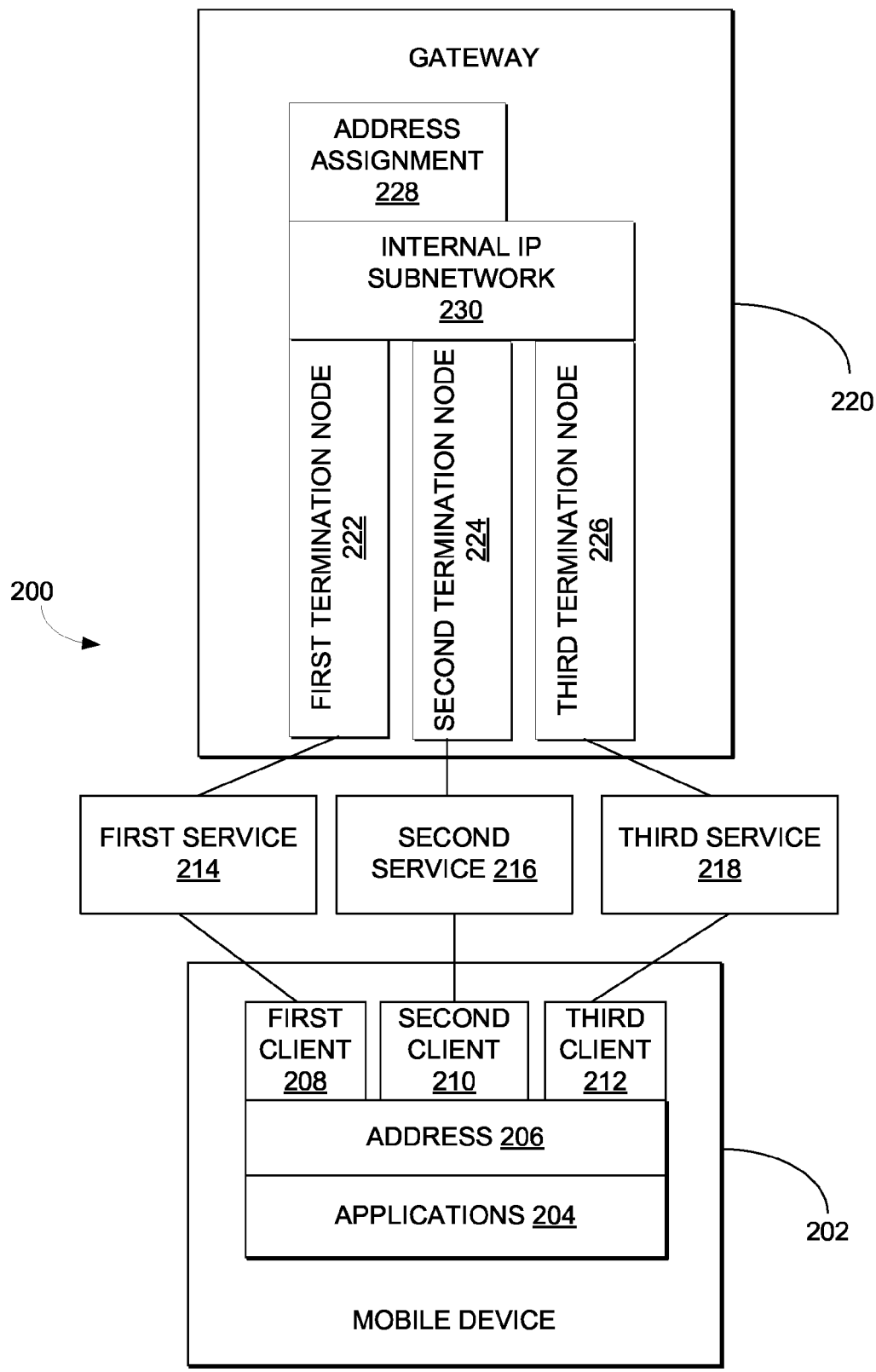
FIG. 2 is a schematic diagram representing a system in accordance with one embodiment of the present invention for establishing connectivity over a plurality of access network technologies.

FIG. 2 illustrates a system 200 for establishing connectivity over a plurality of access technologies. The system 200 includes a mobile communication device 202. The device 202 may be one of any number of devices capable of communicating wirelessly over an air interface. The device 202 may include applications 204 that run on the device 202. For example, the applications 204 may include a browsing application, such as a Wireless Application Protocol (WAP) browser. When initiated, the browser may receive content from a host device via the Internet (or other IP network).

To receive such content, the device 202 may be assigned an address 206, such as an IP address. The address 206 may be a unique identifier that allows the client device 202 to be identified and for packets to be broadcast to the device 202. In one embodiment, the address 206 is dynamically assigned to the client device 202 when it is authenticated to a network so as to allow exchange of communications between host devices and the client device 202.

In one embodiment, the mobile communication device 202 is capable of communicating over multiple wireless access technologies. For example, the device 202 includes three clients, clients 208, 210 and 212. Each of the clients 208, 210 and 212 provides support for a separate access technology. For example, the first client 208 may enable connectivity using CDMA, while the second client 210 may be enable WiFi communications. As will be appreciated by those skilled in the art, having multiple such clients on a single device may allow for greater flexibility/control in initiating and maintaining wireless connections. A variety of networking functions may be performed by the clients 208, 210 and 212. For example, the clients may include software configured to communicate with a gateway or other network elements.

The system 200 includes services 214, 216 and 218. These services may include a variety of elements that provide and/or facilitate utilization of the various access technologies. For example, each of the services 214, 216 and 218 may have means for facilitating IP connectivity over one of the access technologies.

To allow the client device 202 to send and receive communications via an IP network, the system 200 includes an access independent IP gateway 220. For example, the gateway 220 may be similar to the gateway 112 illustrated by FIG. 1 and may function as a terminating point for all bearer and signaling traffic entering a core IP network. Optionally, the gateway 220 may also support the following functions, which are known in the art: AAA (Authorization, Authentication, and Accounting) client; NAS (Network Access Server) device; IDS (Intrusion Detection System) access and enforcement point; hot-lining device; prepaid client; Foreign Agent (FA); a network mobility agent (to provides a mechanism for layer three (L3) mobility management between gateways without the need for Mobile IP signaling over the air); QoS enforcement point; policy enforcement point; NFCC (Network Firewall Configuration and Control) packet filter; and IAP (Intercept Access Point) (lawful Intercept). Any number of additional and/or related functions may also be performed by the gateway 220.

The gateway 220 includes three termination nodes, nodes 222, 224 and 226. Each of these nodes is associated with a different access network technology. For example, the first termination node 222 may receive communications when the device 202 is using CDMA, while the second termination node 206 may receive communications when the device 202 is using WiFi. In one embodiment, the first client 208 may use the first service 214 to initiate a session that terminates a tunnel (Layer 2 or 3) at the node 222. A variety operations and protocols may facilitate such tunneling. The nodes also may provide a variety of functions, as required for a particular access technology.

As will be appreciated by those skilled in the art, there exists a set of common functions performed by each of the different access technologies. Because the gateway 220 supports at least three different access technologies, these common functions may be performed in a manner that is agnostic to the underlying access technology. Accordingly, the need for separate systems to support these common functions is minimized, along with the costs associated with devices moving between technologies.

As an example, a common function performed by each of the access technologies is the assignment of IP addresses. Instead of having disparate assignment procedures and individual subnetworks for each access technology, the gateway 220 includes an address assignment component 228 that assigns IP addresses (e.g., the address 206) to client devices in communication with the gateway 220. Such assignment of IP addresses allows devices using different access technologies with tunnels terminating at the nodes 222, 224 and 226 to plug into a common subnetwork 230. Thus, devices utilizing different access technologies may broadcast packet to one another directly over the subnetwork 230. As will be appreciated by those skilled in the art, such a common subnetwork minimizes IP handoffs and increases the network efficiency when providing real time services across a wireless infrastructure.

Figure 3:
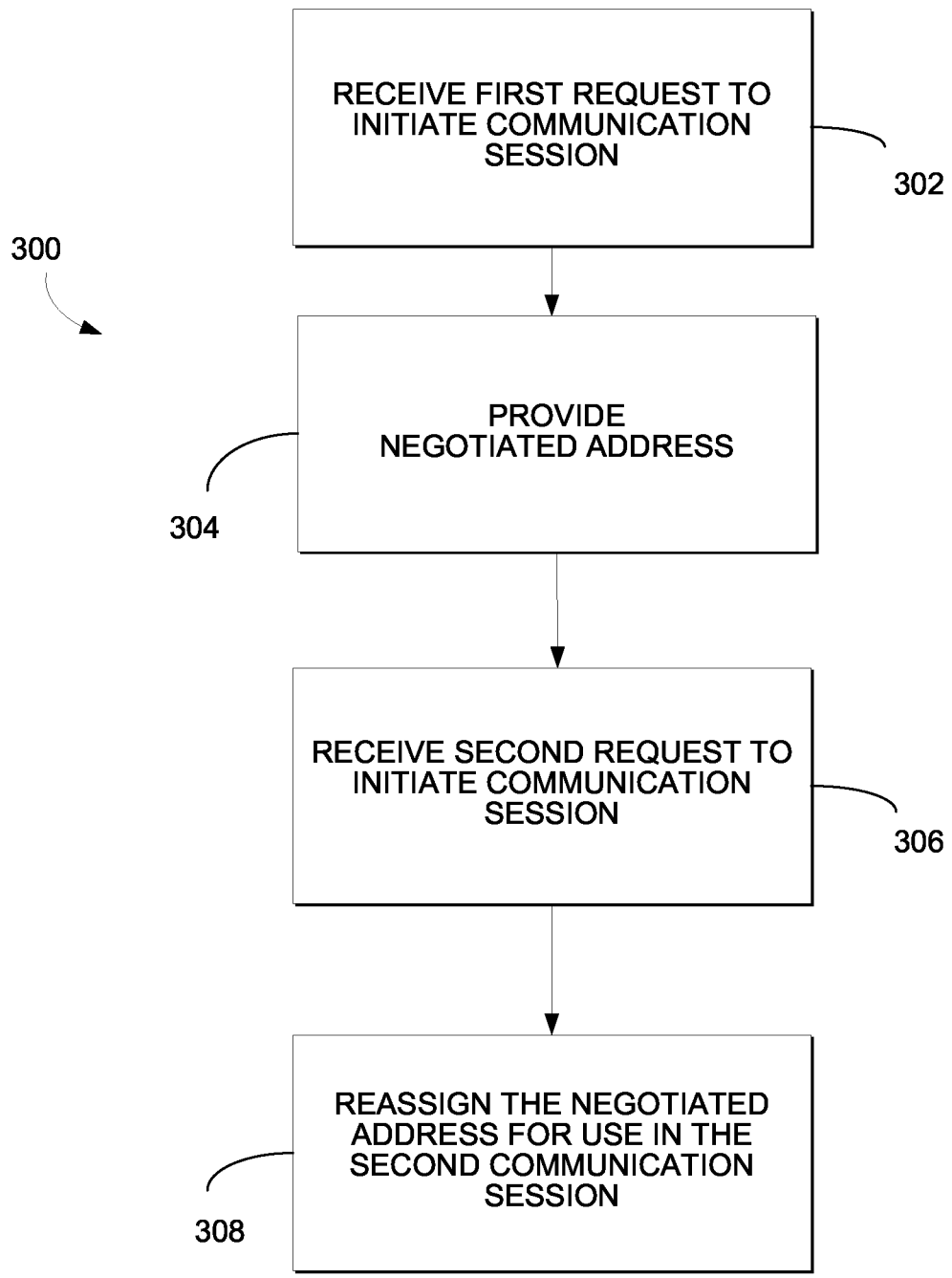
FIG. 3 illustrates a method in accordance with one embodiment of the present invention for allowing a mobile device to communicate over multiple wireless access technologies.

FIG. 3 illustrates a method 300 for allowing a mobile device to communicate over multiple wireless access technologies. The method 300, at a step 302, receives a request to initiate a communication session. The request may originate from one of any number of different client devices equipped to communicate wirelessly with a network. The request may be formatted in accordance with any number of different protocols, and a variety of access technologies may be used to broadcast the request. Once sent from the client device, the request may be communicated amongst various element of the network before reaching an element configured to perform the method 300. In one embodiment, the request is forwarded to a gateway such as the gateway 220 of FIG. 2. Such a gateway may be configured to provide a variety of functions allowing the client device to communicate, for example, over an IP network.

At a step 304, a negotiated address is provided to the client device. For example, the address may be an IP address. As known to those skilled in the art, when a client device seeks to communicate over a network a variety of authentication and assignment functions must be performed to enable such communication. One of these functions is the assigning of a unique identifier such as an IP address.

In one embodiment, the assignment of an IP address is done without regard to the access technology being utilized by the client devices. Because each of the various access technologies includes means for such assignment, the method 300 may perform this task in the same or a similar manner for each access technology. Once an IP address is assigned to the client device, the client may then communicate over an IP network. For example, the client may send packets to a host device on the network. The host device, with knowledge of the client's IP address, can use the address to transmit packets back to the client device.

The method 300, at a step 306, receives a second request to initiate a communication session. The second request may be similar to the first request received at the step 302. In one embodiment, the primary difference between the first and the second requests is that they utilize different access technologies. The client device may be capable of communicating via a plurality of wireless access technologies, and the device may change connectivity from a first access technology to a second access technology. Such switching of access technologies may occur for a number of difference reasons, such as the physical movement of the client device.

At a step 308, the method reassigns the previously-negotiated address to the client device for use during the second communication session. In one embodiment, the second request contains the IP address that was provided at the step 304. As the IP address assignment function is made aware of the device's previously assigned address, this address may be reassigned to the same device. Any connections with a host device over the network may, thus, be maintained because the negotiated IP address did not change. As will be appreciated by those skilled in the art, by leveraging the commonalities amongst the functions performed for the various access technologies, the method 300 may improve efficiency in establishing and maintaining connectivity with client devices over a plurality of access technologies.

Figure 4:
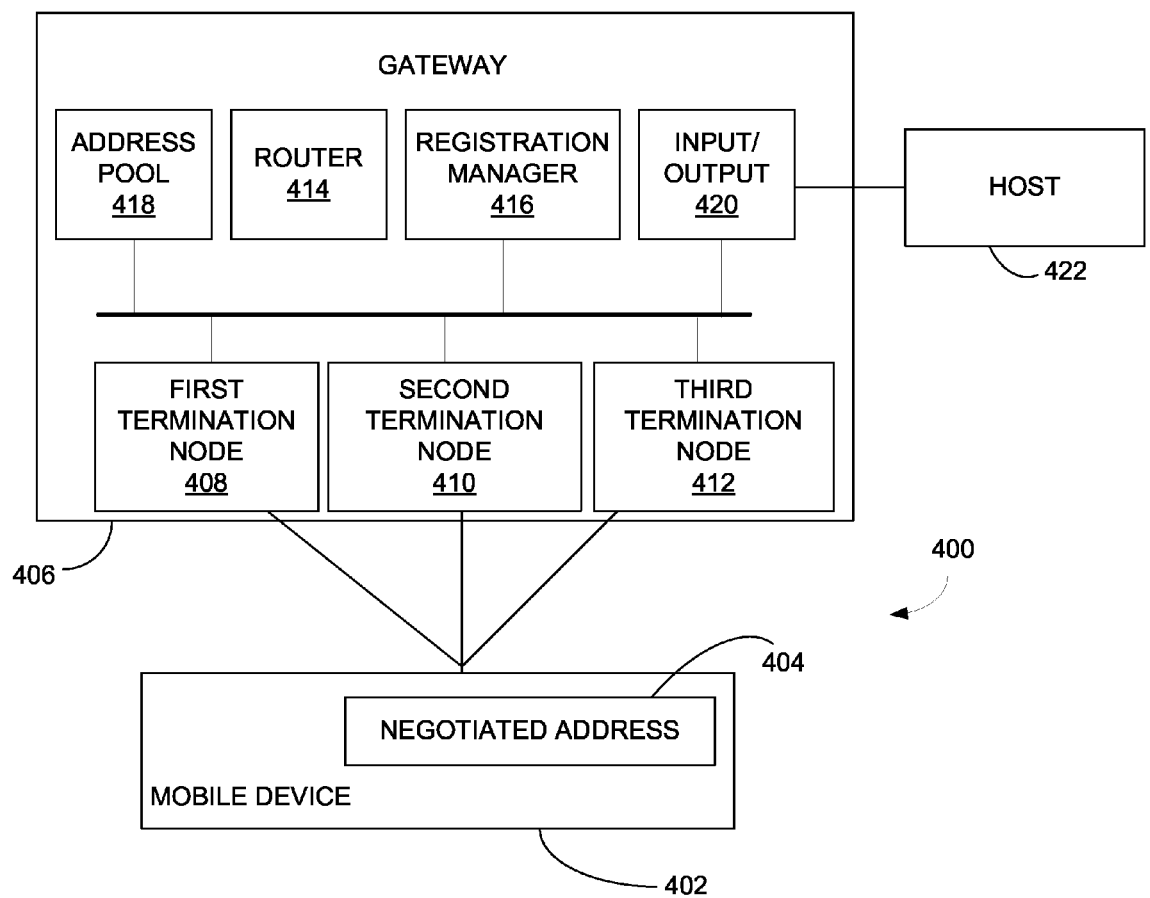
FIG. 4 is a schematic diagram representing a system in accordance with one embodiment of the present invention for establishing connectivity over a plurality of access network technologies.

FIG. 4 illustrates a system 400 for establishing connectivity over a plurality of access network technologies. The system includes a mobile device 402. The mobile device 402 may be one of any number of devices capable of communicating wirelessly over an air interface. In one embodiment, the mobile device 402 is capable of communicating over multiple wireless access technologies. For example, the mobile device 402 may be equipped with the means to communication using CDMA, WiFi and/or WiMax. The device 402 may also include applications for communicating and exchanging information with other devices on a network. To enable such communication, the mobile device 402 may be assigned a negotiated address 404. The address 404 may be a unique identifier on the network that allows the client device 402 to be identified and for packets to be sent to the device. For example, the negotiated address 404 may be an IP address.

Regardless of the access technology utilized, the system 400 employs a gateway 406 to serve as the termination point for communication sessions originated from the mobile device 402. Any number of network devices may facilitate such communication between the mobile device 402 and the gateway 406.

The gateway 406 includes three different termination nodes, nodes 408, 410 and 412. Each of these nodes is associated with a different access network technology. For example, the first termination node 408 may receive communications in accordance with WiFi, while the second termination node 410 may receive communications in accordance with WiMax. In one embodiment, the mobile device 402 may initiate a session that terminates a tunnel (Layer 2 or 3) at one of the nodes. The nodes may provide a variety of functions, as required for a particular access technology. Further, the gateway 406 may include a router 414, which serves as the Layer 3 termination and which routes information from the device 402 to various elements of the gateway 406.

Once communication with the gateway 406 is established, the device 402 must be authenticated and registered with the network before it may communicate with host devices. To allow such registration, the gateway 406 includes a registration manager 416. The registration manager 416 is capable of authenticating/registering the device 402. As different access technologies require different authentication/registration procedures, the registration manager 416 may be equipped to perform such procedures for each of the supported access technologies. In one embodiment, the registration manager 416 is configured to provide the mobile device 402 the negotiated address 404. The address 404 may be selected from a pool of available addresses stored in an address pool 418.

Once an address has been assigned to the device 402, the device may begin communicating with an IP network via the gateway 406. In one embodiment, using an input/output component 420, the mobile device 402 may send to and receive packets from a host device 422 over the IP network. As an example, the device 402 may negotiate connectivity to the first termination node 408 using a first access technology. Using the router 414 and the registration manager 416, the device 402 may obtain the negotiated address 404. Subsequently, the mobile device 402 may communicate with the host 422 using the negotiated address 404.

In the event the device changes connectivity from the first access technology to a second access technology, the second termination node 410 may be utilized. In one embodiment, the device 402 may communicate its negotiated address 404 to the gateway 406 via the second access technology. The registration manager 416 may recognize the device 402 and authenticate/register the device 402 in accordance with the second access technology. In such registration, the registration manager 416 may reassign the address 404 to the device 402. The device 402 may continue to use the address 404 to communicate with the host device 422. As will be appreciated by those skilled in the art, as the same IP address is used to identify the device 402, communications between the device 402 and the host device 422 will not be interrupted, despite the change in access technologies.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A system for establishing connectivity over a plurality of access network technologies, the system comprising:
   a client device configured to communicate over a network by utilizing a first access technology and by utilizing a second access technology; and
   a gateway in communication with said client device via said network, said gateway comprising:
   a first access technology termination node configured to communicate with said client device over said first access technology, wherein said first access technology termination node is further configured to terminate a first tunnel initiated by said client device into a common network residing internally in said gateway;

a second access technology termination node configured to communicate with said client device over said second access technology, wherein said second access technology termination node is further configured to terminate a second tunnel initiated by said client device into said common network; and a registration manager configured to assign said client device an address on said common network for identifying said client device, wherein said registration manager is further configured to maintain, without an IP handoff, the address assigned to said client device when said client device switches from utilizing said first access technology to utilizing said second access technology, wherein said address uniquely identifies said client device on said network and is utilized to route data packets over said common network and via said second tunnel to said client device before, during and after a transition by said client device between use of said first access technology and said second access technology.

2. The system of claim 1, wherein said client device is a mobile communications device, and wherein said gateway enables said client device to communicate over an IP network.

3. The system of claim 1, wherein at least one of said first access technology and said second access technology are selected from a list including: Code Division Multiple Access (CDMA); IEEE 802.3 standards; IEEE 802.11 standards; and IEEE 802.16 standards.

4. The system of claim 1, wherein said gateway further comprises a third access technology termination node configured to communicate with said client device over a third access technology.

5. The system of claim 4, wherein said registration manager is further configured to maintain the address assigned to said client device when said client device switches between utilizing said first access technology, said second access technology or said third access technology.

6. The system of claim 1, wherein said address is an Internet Protocol address.

7. The system of claim 1, wherein said gateway further comprises a subnetwork that services client devices utilizing said first access technology and client devices utilizing said second access technology.

8. The system of claim 1, wherein said gateway is further configured to provide uninterrupted communications between said client device and a host device while said client device switches between utilizing said first access technology and utilizing said second access technology.

9. A computer-implemented method for interacting with a mobile device capable of communicating over multiple access technologies, the method comprising:

receiving from said mobile device a first request to initiate a first communication session over a first access technology;

providing said mobile device a negotiated address on a common network residing internally on a gateway for utilization during said first communication session, wherein said negotiated address is an Internet Protocol address;

utilizing a first access technology termination node of said gateway to communicate with said mobile device over said first access technology, wherein said first access technology termination node terminates a first Layer 2 or Layer 3 tunnel initiated by said mobile device into said common network;

receiving from said mobile device a second request to initiate a second communication session over a second access technology;

utilizing a second access technology termination node of said gateway to communicate with said mobile device over said second access technology, wherein said second access technology termination node terminates a second Layer 2 or Layer 3 tunnel initiated by said mobile device into said common network; and reassigning to said mobile device said negotiated address on said common network for utilization during said second communication session such that said negotiated address is utilized to route data packets over said common network and via said second layer 2 or layer 3 tunnel to said mobile device before, during and after a transition by said mobile device between use of said first access technology and said second access technology.

10. The method of claim 9, wherein said second request contains said negotiated address.

11. The method of claim 9, wherein said first and said second access technologies are wireless access technologies.

12. The method of claim 9, further comprising initiating communications with a host device using said first access technology and said negotiated address.

13. The method of claim 12, further comprising maintaining uninterrupted communications between said mobile device and said host device while switching to use of said second access technology.

14. The method of claim 9, wherein said mobile device includes one or more applications that include mobile IP functionality.

15. A gateway for establishing connectivity with client devices over a plurality of access technologies, the gateway comprising:

a first access technology termination node configured to utilize a first access technology for communication with at least a portion of the client devices, wherein said first access technology termination node is further configured to terminate a first Layer 2 or Layer 3 tunnel into a common network residing internally in said gateway;

a second access technology termination node configured to utilize a second access technology for communication with at least a portion of the client devices, wherein said second access technology termination node is further configured to terminate a second Layer 2 or Layer 3 tunnel into said common network; and an address assignment component configured to assign addresses on said common network for identifying at least a portion of the client devices in communication with said first access technology termination node and to assign addresses on said common network for identifying at least a portion of the client devices in communication with said second access technology termination node, wherein said address assignment component is further configured to maintain an address that is utilized to route data packets over said common network and via said second layer 2 or layer 3 tunnel to a client device before, during and after a transition by said client device between use of said first access technology to utilizing said second access technology.

16. The gateway of claim 15, wherein at least one of said first access technology and said second access technology are selected from a list including: Code Division Multiple Access (CDMA); IEEE 802.3 standards; IEEE 802.11 standards; and IEEE 802.16 standards.

17. The gateway of claim 15, wherein said internal subnetwork services client devices utilizing said first access technology and client devices utilizing said second access technology.

18. The gateway of claim 15, wherein said address assignment component is further configured to maintain an address assigned to a client device when said client device switches from utilizing said first access technology to utilizing said second access technology.

19. The gateway of claim 15, wherein said gateway is at least one of a Layer 3 termination point or a Layer 2 termination point for communications from at least a portion of the client devices.

20. The gateway of claim 15, further comprising a third access technology termination node configured to utilize a third access technology to communicate with at least a portion of the client devices, wherein said address assignment component is further configured to maintain an address assigned to a client device when said client device switches between said first, second and/or third of access technologies.

* * * * *